Dec. 7, 1965 R. J. GOODWIN ETAL 3,221,505
GROUTING METHOD
Filed Feb. 20, 1963 2 Sheets-Sheet 1

INVENTORS.
FREDERICK L. BECKER
ROBERT J. GOODWIN
BY
ATTORNEY.

Dec. 7, 1965     R. J. GOODWIN ETAL     3,221,505

GROUTING METHOD

Filed Feb. 20, 1963     2 Sheets-Sheet 2

INVENTORS.
FREDERICK L. BECKER
ROBERT J. GOODWIN
BY

ATTORNEY.

United States Patent Office 3,221,505
Patented Dec. 7, 1965

3,221,505
GROUTING METHOD
Robert J. Goodwin, Oakmont, Pa., and Frederick L. Becker, Northfield, Ohio, assignors to Gulf Research & Development Company, Pittsburgh, Pa., a corporation of Delaware
Filed Feb. 20, 1963, Ser. No. 259,988
10 Claims. (Cl. 61—36)

This invention relates to a method for controlling the flow of fluids through underground formations, and more particularly to a method for creating an impermeable barrier in a permeable underground formation to prevent water or gas flow into a protected area.

Frequently, when sinking a shaft for a mine or other purpose, a permeable water- or gas-bearing formation is encountered. The resultant flow of water or gas into the shaft may require the installation of pumps or blowers to remove the water or gas, and in more serious cases, gas or water flow into the shaft may cause abandonment of the shaft. One method that has been used to prevent flow into a shaft is to coat the walls of the shaft with cement. Cementing is slow and costly because of the necessity of installing suitable forms in the shaft, and is ineffective if the water or gas is under substantial pressure or the rate of flow into the shaft is high.

Processes have been used to create impermeable barriers around wells by the injection of liquids or gaseous reagents into a formation surrounding the well to react with liquids present in the formation, or in some instances with the formation, to plug the formation. Such processes are effective where a barrier of limited extent close to the point of injection is desired, but are not effective in creating barriers of substantial length. The liquid or gaseous reagents react in the formation close to the well and, by plugging the formation close to the well, prevent flow of the reagent to more remote areas.

This invention resides in a method of creating an impermeable barrier in a subsurface formation by displacing a water-miscible liquid through the permeable formation to remove water therefrom, and thereafter displacing a gaseous reagent, capable of reacting with water to form a solid material capable of plugging the formation, into the portion of the formation from which water has been removed. The gaseous reagent reacts with water present in the formation along the boundaries of the dehydrated portion of the formation to create the desired barrier. In a method of performing the process of this invention, a series of substantially parallel holes are drilled through the permeable formation in a line adjacent the desired location of the barrier. A water-miscible liquid, preferably an alcohol, is displaced down one of the holes and through the permeable formation to an adjacent hole to remove water from the formation between the two holes. While pressure is maintained on the holes to prevent flow of water into the dehydrated portion of the formation, a gaseous reagent, preferably silicon tetrafluoride, is displaced into the dehydrated portion of the formation under a pressure causing the gaseous reagent to flow to the boundaries of that portion of the formation, where it reacts with water present in the formation to form a precipitate plugging the formation and preventing the flow of fluids therethrough.

Figure 1:
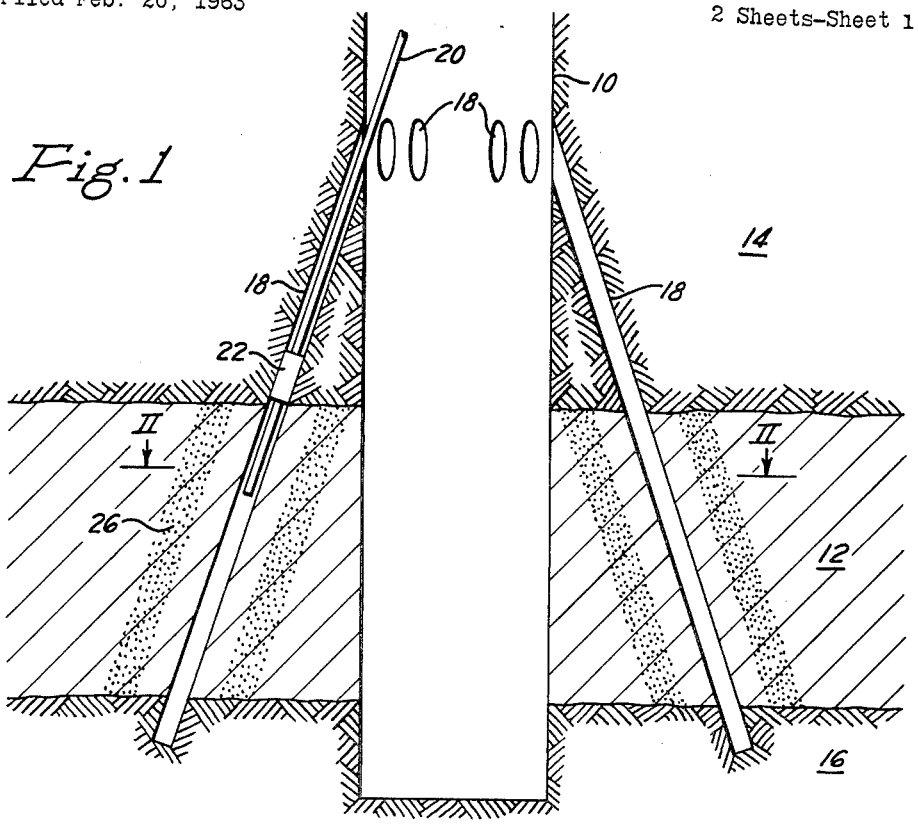
FIGURE 1 is a diagrammatic view, partially in vertical section, of a shaft through a permeable water-bearing formation through which holes have been drilled for creating a barrier in accordance with this invention.
Figure 2:
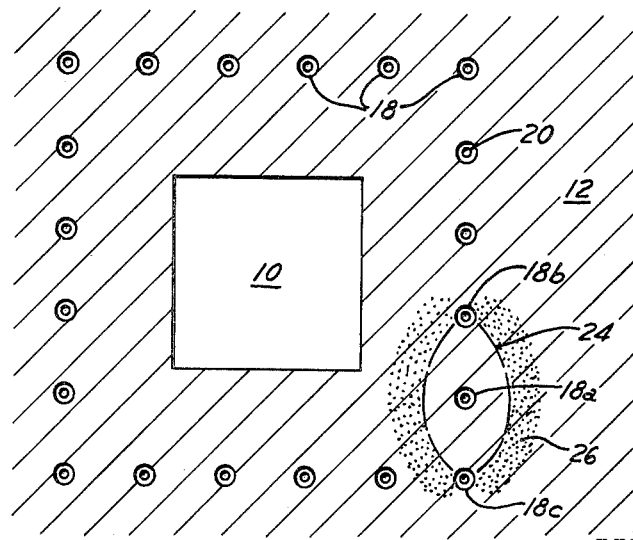
FIGURE 2 is a horizontal sectional view taken along the section line 2—2 in FIGURE 1 showing the arrangement of the holes drilled through the formation to be plugged.

Referring to FIGURE 1 a shaft 10 is illustrated extending downwardly through a permeable water-bearing formation 12 between cap rock 14 and base rock 16. A series of holes 18 is drilled from shaft 10 diagonally outwardly and downwardly from an elevation in the cap rock 14, through the water-bearing formation 12 and into base rock 16. As shown in FIGURE 2, holes 18 are spaced apart a distance slightly less than the distance from the holes to the shaft 10 in a line completely surrounding the shaft.

A pipe 20 extends downwardly into each of the holes 18 for the displacement of the fluids through the formation to create the barrier. Pipes 20 are equipped with suitable packing means 22 to seal the space between the outer surface of the pipes and the walls of the holes 18. The packing means 22 are set above the upper boundary of the water-bearing formation 12 to permit treatment of the water-bearing formation over its full thickness. The upper ends of the pipes 20 are connected to suitable equipment, not shown, for the injection of fluids into, or withdrawal of fluids from, the holes 18.

After installation of the pipes and packing means for the injection and withdrawal of fluids, a water-miscible liquid is delivered through the pipes 20 into one of the holes 18, indicated by reference numeral 18a in FIGURE 2, and is displaced outwardly from hole 18a through the permeable formation 12 to adjacent holes 18b and 18c. After passing through the formation, water driven ahead of the water-miscible liquid, a transition zone of water in solution in said liquid, and finally the water-miscible liquid flow into holes 18b and 18c and are discharged from the pipes 20 in those holes. Displacement of the water-miscible liquid from the hole 18a to holes 18b and 18c is continued until the water content of the water-miscible liquid discharged from holes 18b and 18c indicates substantial dehydration of the portion of the formation, the boundaries of which are indicated by reference numeral 24 in FIGURE 2, swept by the injected liquid. The amount of water-miscible liquid displaced through the formation will be determined by the amount of water present in formation 12. It is necessary to remove sufficient water from the formation within the boundaries 24 to allow subsequent displacement of the gaseous reagent through the formation from hole 18a to holes 18b and 18c and substantially uniform penetration of the swept portion by the reactant gas. The miscible flood is highly effective in obtaining the desired dehydration.

In some instances formation 12 may be stratified in a manner which prevents any substantial vertical flow through the formation 12. It may then be necessary to isolate strata of formation 12 by means of spacer packers on pipes 20 and treat each of the isolated strata separately to form the desired barrier.

After the formation 12 within the boundaries 24 has been dehydrated to the desired extent, air is displaced downwardly into hole 18a and outwardly through the formation to holes 18b and 18c to remove water-miscible liquid and establish gas permeability between the hole 18a and holes 18b and 18c. The injection of air reduces contamination of the water-miscible liquid with the subsequently injected gaseous reagent and thereby permits reuse of the water-miscible liquid. The air is followed by a gaseous reagent which will react with water present in the formation to form a solid material precipitate. The gaseous reagent is injected through hole 18a and withdrawn through holes 18b and 18c to establish the existence of the gaseous reagent through the dehydrated portion of the formation 12. Thereafter holes 18b and 18c are shut in while the injection of the gaseous reagent through hole 18a continues. The gaseous reagent flows outwardly beyond the boundary 24 and reacts with water present in the formation 12 to precipitate a solid in the passages of the formation 12 to form a barrier to fluid flow. Creation of the desired barrier is indicated by plugging of the formation which prevents further injection of the gaseous reagent through hole 18a. It is a characteristic of the reactant gas that it will finger its way through the water because of its relatively low viscosity and will react with water for a substantial distance beyond the boundary 24 to form a precipitate extending a substantial depth into the formation to create a barrier 26, indicated in FIGURE 1 by stippling. The procedure described for holes 18a, 18b, and 18c is then repeated at adjacent holes until a cintinuous barrier extending all of the way around the shaft has been formed. A barrier completely surrounding the shaft also can be performed in a single operation by simultaneously injecting the water-miscible liquid at every other hole in the entire series and withdrawing liquid from intervening holes, followed by simultaneous injection of the gaseous reagent into each injection hole.

Water-miscible liquids that can be used to dehydrate a portion of the formation are nonaqueous liquids which have substantial solubility in water and will not interfere with the reaction of the gaseous reagent with liquids present in the formation. Alcohols containing 1 to 4 carbon atoms, and especially methyl, ethyl and iso-propyl alcohols are preferred because of their low cost. Acetone, acetaldehyde and dimethyl ether also can be used. These liquids, which are highly soluble in water, result in a miscible drive which is very effective in removing water from the formation between the injection and the removal holes. In contrast, merely circulating a gas or a water-immiscible liquid through the formation is effective in removing only a small part of the water from the swept portion of the formation.

The gaseous reagent displaced into the formation following the water-miscible liquid is one which will react with water present in the formation beyond the boundary of the dehydrated section of the formation to form a material of a solid or semisolid nature which will plug channels in the formation and prevent flow of fluids therethrough. The reaction product may be a solid precipitate or a gel-like material having a viscosity high enough to withstand the pressure of the permeable formation and prevent flow through the channels in the formation. Such materials are herein referred to as precipitates. A preferred gaseous reagent is silicon tetrafluoride. Silicon tetrafluoride has a very low boiling point and a critical temperature of 0.5° C.; hence is gaseous at all conditions of temperature and pressure likely to be encountered in subsurface formations. Another suitable gaseous reagent is methyl trichlorosilane. Both silicon tetrafluoride and methyl trichlorosilane react with water in permeable formations to form a precipitate which prevents further injection of the gas and thereby provides an effective indication of when the formation has been plugged.

This invention has been described for the creation of a barrier in a permeable water-bearing formation. It is also effective in creating barriers in gas-bearing formations to prevent flow of gas into a shaft penetrating such formations. Gas-bearing formations may not contain sufficient water to form enough precipitate to plug the formation upon reaction with the gaseous reagent. It then will be desirable to precede the injection of the water-miscible liquid with an injection of enough water to insure the presence of sufficient water beyond the boundaries of the subsequently dehydrated section.

A gaseous reagent that reacts with water to form the barrier is preferred because in most instances the barrier will be created in a formation in which water already is present. The process can also be used with a reactant gas that reacts with liquids other than water to form the desired precipitate. For example, an aqueous solution of aluminum sulfate can be displaced into the permeable formation ahead of the water-miscible liquid and ammonia gas displaced into the formation after the water-miscible liquid. Examples of other combinations of liquid and gaseous reagents that can be used are lead acetate solution followed by hydrogen sulfide gas and barium chloride solution followed by sulfur trioxide gas.

Figure 3:
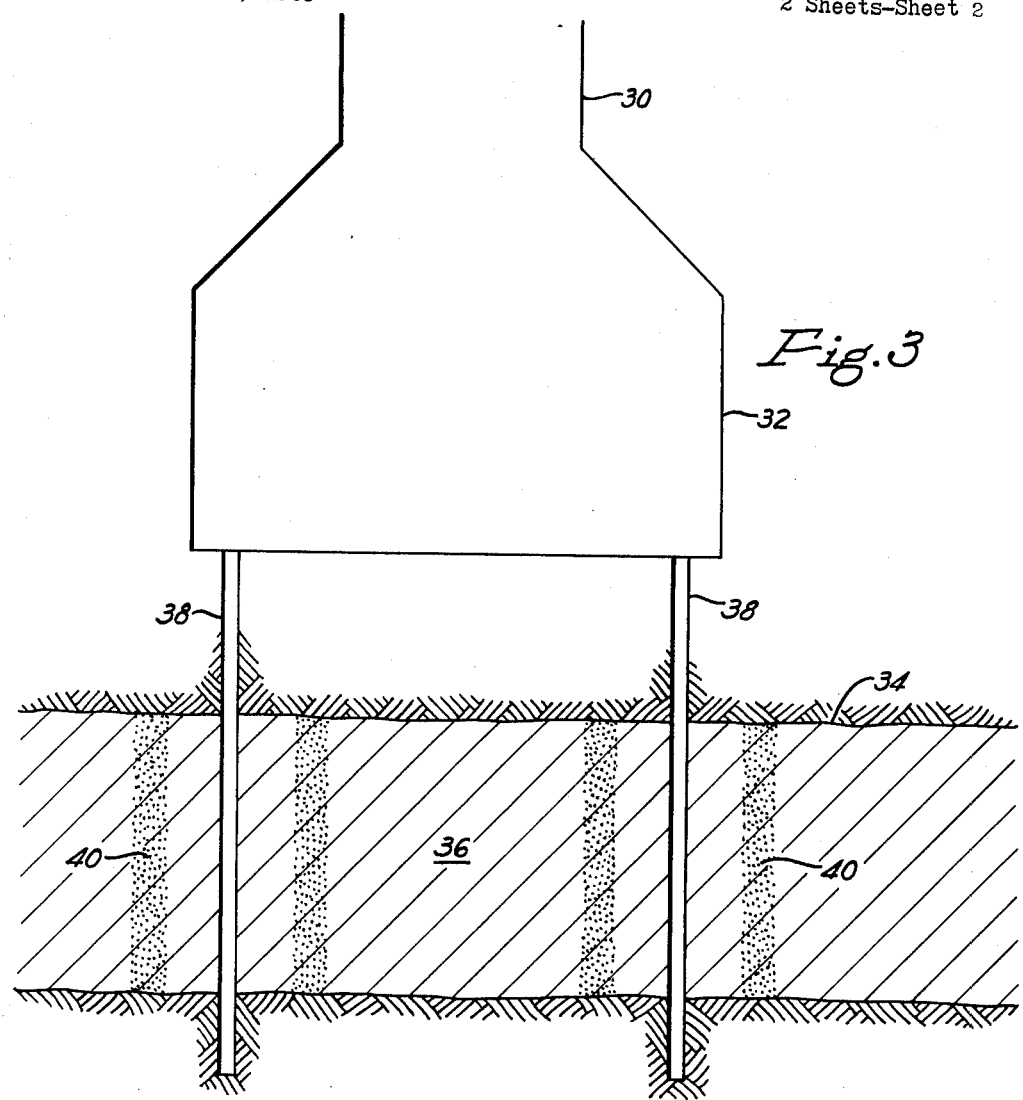
FIGURE 3 is a diagrammatic view, partially in vertical section, illustrating a technique for isolating a section of a permeable formation prior to sinking a shaft through the permeable formation.

In FIGURE 3 of the drawings, an embodiment of the invention has been illustrated for creating a barrier in a subsurface formation by the process of this invention before the formation has been penetrated by a shaft. Referring to FIGURE 3, a shaft indicated generally by reference numeral 30 has an enlarged portion 32 above the upper boundary 34 of a permeable water-bearing formation 36. A series of holes 38 is drilled, in a line completely surrounding the proposed shaft, downwardly from the bottom of the enlarged portion 32 through the water-bearing formation 36. Pipes, not shown in FIGURE 3, are run into the upper end of each of the holes 38 in a manner similar to that described for the installation of pipes 20 in holes 18. The procedure described in holes 18a, 18b, and 18c is repeated for holes 38 until a continuous barrier indicated in FIGURE 3 by the stippling 40 is created through the water-bearing formation 36. Thereafter, the shaft 30 can be drilled through formation 36, and the barrier 40 prevents flow of water in the shaft. In the embodiment of the invention illustrated in FIGURE 3, the holes 38 can be substantially farther apart than in the embodiment illustrated in FIGURE 2 because there is no possibility of release of injected water-immiscible liquid and gaseous reagent into the shaft as there was in the embodiment illustrated in FIGURE 1.

Figure 4:
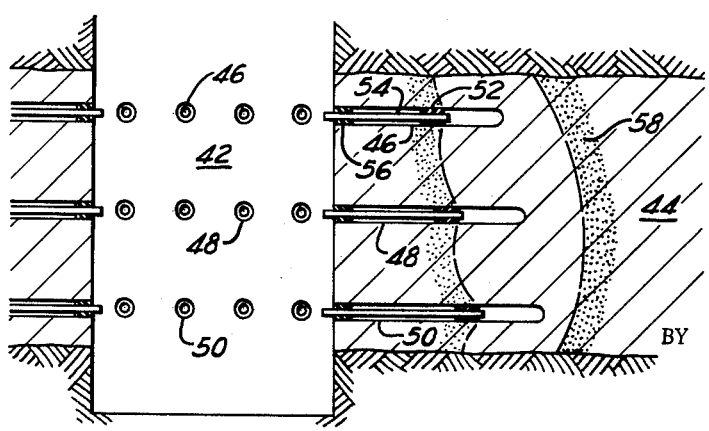
FIGURE 4 is a diagrammatic view, partially in vertical section, of another embodiment of this invention for creation of a barrier around a shaft.

It is not essential that each of the holes drilled into the permeable water- or gas-bearing formation extend completely through the formation. In the embodiment illustrated in FIGURE 4, a shaft 42 penetrates a permeable water-bearing formation 44. A series of holes 46 is drilled from shaft 42 substantially perpendicular to the walls of the shaft and into the formation 44. Holes 46 are drilled near the upper boundary of formation 44. Other holes 48 and 50 are drilled into the formation 44 near the middle and lower boundary, respectively, of formation 44. Packers 52 are set in each of the holes 46, 48, and 50 near the end remote from shaft 42. A pipe 54 is run through each of the packers 52, and the spaces surrounding the pipes 54 are sealed near the face of shaft 42, as indicated by reference numeral 56. In the embodiment of the invention illustrated in FIGURE 4, holes 48 are used for the injection of the water-miscible liquid, air, and reactant gas, and holes 46 and 50 are used for the withdrawal of fluids in a process similar to that described for FIGURE 1 to create a barrier, indicated by stippling 58, at a substantial distance from the wall of shaft 42. It will be appreciated that the arrangement of holes illustrated in FIGURE 4 is only exemplary and the particular arrangement of the holes for the displacement of the fluids through the formation to be plugged will depend largely on the thickness and characteristics of the formation.

It is an important advantage of the process of this invention over processes heretofore available that the barrier is created in the formation at a position spaced from the face of the shaft. The intervening formation between the barrier and the face of the shaft provides a base supporting the precipitate created by the reaction of the gas with liquid in the formation against the pressure of fluids in the formation.

The circulation of the water-miscible liquid from one hole to another hole and removal of the injected liquid allows observation of flow of the injected liquid through the formation. The water-miscible liquid can be circulated as long as required to assure removal of aqueous liquids from a portion of the formation extending from the lower to upper boundaries of the formation. Reactive gas subsequently displaced into the formation then occupies the full depth of the formation and flows outwardly from the dehydrated portion of the formation to create a continuous barrier through the full depth of the permeable formation.

We claim:

1. A method of creating an impermeable barrier extending from a first location in a permeable subsurface formation containing an aqueous liquid to a second location in the permeable formation spaced from the first location comprising injecting a non-aqueous water-miscible liquid into the subsurface formation adjacent said first location, displacing the water-miscible liquid through the formation to drive water through the formation, withdrawing the water-miscible liquid and displaced water from the formation adjacent said second location whereby said formation is dehydrated between the area of injection and the area of withdrawal of the water-miscible liquid, maintaining pressure on the dehydrated portion of the formation to prevent flow of water into said portion from the surrounding formation and displacing into the dehydrated portion of the formation a gaseous reagent reactable with the aqueous liquid in the formation to form a solid water-insoluble precipitate, and displacing said gaseous reagent into the formation adjacent the dehydrated portion whereby said gaseous reagent reacts with aqueous liquids therein to plug the formation.

2. A method as set forth in claim 1 in which the water-miscible liquid is selected from the group consisting of alcohols having 1 to 4 carbon atoms, acetone, acetaldehyde, and dimethyl ether.

3. A method as set forth in claim 1 in which the reactive gas is selected from the group consisting of a silicon tetrafluoride and methyl trichlorosilane.

4. A method as set forth in claim 1 in which the reactive gas is silicon tetrafluoride.

5. A method of creating an impermeable barrier extending from a first location to a second location spaced from the first location in a permeable subsurface formation containing aqueous liquids comprising drilling a first hole adjacent to the first location and a second hole adjacent to the second location, displacing down the first hole and through the intervening formation to the second hole a non-aqueous water-miscible liquid, removing water-miscible liquid and water at the second hole whereby a section of the formation between the first and second hole is dehydrated, maintaining pressure on the dehydrated portion of the formation to prevent flow of water into said portion from the surrounding formation and following the water-miscible liquid with a reactant gas capable of reacting with the aqueous liquids in the formation to form a water-insoluble precipitate, and applying pressure to the reactant gas into the formation to displace said gas from the dehydrated section of the formation into the surrounding formation to react with liquid in the formation and plug said formation.

6. A method of creating an impermeable barrier in a permeable formation containing aqueous liquids around a shaft penetrating said formation comprising drilling a series of holes in a line surrounding the shaft and spaced therefrom, said holes extending through the permeable formation from the upper to the lower boundaries thereof, displacing a non-aqueous water-miscible liquid down a first hole and from said first hole through the impermeable formation to an adjacent hole, removing water-miscible liquid from said adjacent hole, continuing the displacement of the water-miscible liquid through the formation to create a dehydrated section of the formation extending from the first hole to the adjacent holes, maintaining pressure on the dehydrated portion of the formation to prevent flow of water into said portion from the surrounding formation and displacing silicon tetrafluoride into the first hole and from the first hole through the dehydrated section of the formation to the adjacent hole, increasing the pressure on the silicon tetrafluoride to displace said silicon tetrafluoride from the dehydrated section outwardly into the surrounding formation whereby the silicon tetrafluoride reacts with water to plug said surrounding formation, and repeating said series of steps in other holes along the line of holes surrounding the shaft to form a continuous barrier around said shaft.

7. A method for creating an impermeable barrier extending from a first location to a second location spaced from the first location in a permeable subsurface formation comprising injecting an aqueous liquid into the subsurface formation, injecting a non-aqueous water-miscible liquid into the subsurface formation adjacent the first location, withdrawing the water-miscible liquid from the formation adjacent the second location whereby aqueous liquid is swept from a portion of the formation, maintaining pressure in the portion of the formation from which the aqueous liquid is swept to prevent movement of water into said portion of the formation and injecting into the portion of the formation from which aqueous liquid is swept a gaseous reagent reactable with the aqueous liquid to form a water-insoluble precipitate, and displacing said gaseous reagent from the dehydrated portion of the formation into the surrounding formation to react with the aqueous liquid to plug the formation.

8. The process as set forth in claim 7 in which the aqueous liquid is water and the gaseous reagent is silicon tetrafluoride.

9. A method of creating an impermeable barrier extending from a first location through a permeable subsurface formation to a second location spaced from the first location, said permeable subsurface formation containing aqueous liquids, comprising drilling a first hole into the subsurface formation adjacent to the first location a second hole into the subsurface formation adjacent to the second location, displacing down the first hole and through the intervening formation to the second hole a non-aqueous water-miscible liquid, withdrawing water-miscible liquid and water at the second hole whereby a section of the formation between the first and second hole is dehydrated, maintaining pressure on the dehydrated section of the formation to prevent flow of water from the surrounding formation into said portion and displacing air down the first hole and through the formation to the second hole to establish gas permeability, following the air with a reactant gas capable of reacting with the aqueous liquids in the formation to form a water-insoluble precipitate, and applying pressure to the reactant gas to displace said gas from the dehydrated section of the formation to react with the aqueous liquid in the surrounding formation to plug said formation.

10. A method of creating an impermeable barrier in a permeable water-bearing formation penetrated by a shaft, said barrier extending continuously around the shaft through the permeable water-bearing formation and being spaced from the wall of the shaft, comprising drilling a first hole laterally from the shaft into the surrounding water-bearing formation, drilling a second hole spaced from the first hole laterally from the shaft into the surrounding water-bearing formation, displacing a non-aqueous water-miscible liquid from the inner end of the first hole into the water-bearing formation and withdrawing water-miscible liquid from the formation at the inner end of the second hole, circulating the water-miscible liquid from the first hole to the second hole until the water content of the liquid discharged from the second hole indicates substantial dehydration of the formation between the two holes, maintaining pressure on the dehydrated portion of the formation to prevent flow of water into said portion from the surrounding formation and injecting into at least one of the first and second holes a gas reactable with water to form a water-insoluble precipitate and displacing said gas through the dehydrated area to the other of said holes, increasing the pressure on the gas to displace the gas from the dehydrated area into the surrounding formation to react with water in the surrounding formation and form a precipitate creating an impermeable barrier, and repeating the series of steps in other holes extending into the formation from the shaft to form a continuous barrier around said shaft.

References Cited by the Examiner

UNITED STATES PATENTS

| | | | |
|---|---|---|---|
| 2,204,223 | 6/1940 | Lawton | 61—36 |
| 2,469,354 | 5/1949 | Bond | 166—30 |
| 3,055,426 | 9/1962 | Kerver et al. | 166—29 |
| 3,070,161 | 12/1962 | Kerver et al. | 166—29 |
| 3,087,542 | 4/1963 | Becker et al. | 166—29 |
| 3,121,462 | 2/1964 | Martin et al. | 166—29 |
| 3,127,934 | 4/1964 | Csaszar | 166—29 |

EARL J. WITMER, *Primary Examiner.*

JACOB L. NACKENOFF, *Examiner.*